United States Patent
Pitts

(10) Patent No.: US 9,440,623 B2
(45) Date of Patent: Sep. 13, 2016

(54) LANDING GEAR LOCKING MECHANISM

(71) Applicant: Jeffery Beauregard Pitts, Pittsview, GA (US)

(72) Inventor: Jeffery Beauregard Pitts, Pittsview, GA (US)

( * ) Notice: Subject to any disclaimer, the term of this patent is extended or adjusted under 35 U.S.C. 154(b) by 0 days.

(21) Appl. No.: 14/536,144

(22) Filed: Nov. 7, 2014

(65) Prior Publication Data

US 2016/0129892 A1 May 12, 2016

(51) Int. Cl.
*B60S 9/02* (2006.01)
*B60S 9/04* (2006.01)
*F16C 11/10* (2006.01)

(52) U.S. Cl.
CPC . *B60S 9/04* (2013.01); *F16C 11/10* (2013.01)

(58) Field of Classification Search
CPC ............ E02F 9/085; B60S 9/02; B60S 9/04; B60S 9/06; B60S 9/08; B60D 1/66; B66C 23/78
USPC ........................................... 280/763.1, 764.1
See application file for complete search history.

(56) References Cited

U.S. PATENT DOCUMENTS

| | | | | |
|---|---|---|---|---|
| 1,840,666 A * | 1/1932 | Grundon | ..................... | 280/765.1 |
| 1,857,611 A * | 5/1932 | Swift | ........................ | 280/764.1 |
| 1,950,589 A * | 3/1934 | Behler | ......................... | 254/419 |
| 2,246,410 A * | 6/1941 | Wilson | ......................... | 280/430 |
| 2,256,328 A * | 9/1941 | Reid | ............... | 254/419 |
| 2,431,245 A * | 11/1947 | Haig et al. | ................. | 280/764.1 |
| 2,885,220 A * | 5/1959 | Dalton | ....................... | 280/766.1 |
| 3,028,176 A * | 4/1962 | Raidel | ......................... | 280/764.1 |
| 3,073,467 A * | 1/1963 | Parks | ............... | 254/45 |
| 3,073,572 A * | 1/1963 | Dalton | ........................ | 254/419 |
| 3,093,362 A * | 6/1963 | Schaefer | ...................... | 254/424 |
| 3,104,891 A * | 9/1963 | Dalton | ....................... | 280/763.1 |
| 3,146,002 A * | 8/1964 | Faber | ......................... | 280/763.1 |
| 3,164,275 A * | 1/1965 | Schatzl et al. | .............. | 414/498 |
| 3,255,995 A * | 6/1966 | Bartlett | ....................... | 254/419 |
| 3,322,392 A * | 5/1967 | Hoffman | ........................ | 254/47 |
| 3,456,962 A * | 7/1969 | Saxton et al. | ............... | 280/430 |
| 3,545,635 A * | 12/1970 | Montan | ..................... | 280/763.1 |
| 3,596,877 A * | 8/1971 | Eastman | ....................... | 254/425 |
| 3,690,694 A * | 9/1972 | Herndon et al. | ........... | 280/763.1 |
| 3,726,543 A * | 4/1973 | Dalton | ....................... | 280/766.1 |
| 3,733,051 A * | 5/1973 | Bollinger | ....................... | 254/94 |
| 3,781,035 A * | 12/1973 | Petersson et al. | ......... | 280/764.1 |
| 3,790,190 A * | 2/1974 | Davis | ............................ | 280/430 |
| 3,801,128 A * | 4/1974 | Herndon | ...................... | 280/763.1 |
| 3,854,750 A * | 12/1974 | Voehringer, Jr. | .......... | 280/764.1 |
| 3,860,216 A * | 1/1975 | Brown | ......................... | 254/423 |
| 3,933,372 A * | 1/1976 | Herndon | ..................... | 280/763.1 |
| 3,989,277 A * | 11/1976 | Stahl | ........................... | 280/764.1 |
| 4,172,604 A * | 10/1979 | Bond et al. | ................ | 280/764.1 |
| 4,325,465 A * | 4/1982 | Lemon | ........................ | 188/4 R |
| 5,067,746 A * | 11/1991 | Baker | ........................ | 280/763.1 |
| 5,205,586 A * | 4/1993 | Tallman | .................... | 280/764.1 |
| 5,451,080 A * | 9/1995 | Kneile | ....................... | 248/354.1 |
| 5,497,969 A * | 3/1996 | Broughton | .................... | 248/352 |
| 5,711,504 A * | 1/1998 | Cusimano | ................. | 248/354.3 |
| 5,901,980 A * | 5/1999 | Few et al. | ................. | 280/763.1 |
| 6,224,102 B1 * | 5/2001 | Nebel | ........................ | 280/765.1 |

(Continued)

*Primary Examiner* — Hau Phan
*Assistant Examiner* — Jacob Meyer
(74) *Attorney, Agent, or Firm* — Robert J. Veal; Veal Intellectual Property, LLC

(57) ABSTRACT

A locking mechanism for a landing gear on a trailer utilizes two pair of locking pins mounted for simultaneous movement between an open position and a locked position such that in the locked position the landing gear is restrained in either a supporting position or a stowed position.

11 Claims, 6 Drawing Sheets

(56) References Cited

U.S. PATENT DOCUMENTS

| | | | |
|---|---|---|---|
| 6,302,381 B1* | 10/2001 | Roll | 254/425 |
| 6,511,279 B1* | 1/2003 | Harkcom et al. | 414/537 |
| 7,097,158 B2* | 8/2006 | BarBaruolo | 254/419 |
| 7,229,058 B2* | 6/2007 | Lyrstrand | 248/503 |
| 7,311,331 B2* | 12/2007 | McGlothlin | 280/765.1 |
| 7,425,012 B1* | 9/2008 | Sease | B60D 1/66 280/475 |
| 7,429,061 B2* | 9/2008 | Perkins | 280/766.1 |
| 7,654,570 B2* | 2/2010 | Giralde | 280/766.1 |
| 8,167,330 B2* | 5/2012 | MacDougall | 280/491.1 |
| RE43,535 E * | 7/2012 | Roll | 254/425 |
| 8,220,833 B2* | 7/2012 | Van Der Plaats et al. | 280/763.1 |
| 8,491,009 B2* | 7/2013 | Shelton | B60P 3/36 254/418 |
| 8,758,358 B2* | 6/2014 | Errico | A61F 2/442 606/86 A |
| 8,944,455 B2* | 2/2015 | Lambros | B60S 9/02 280/475 |
| 9,156,440 B2* | 10/2015 | Klassy | |
| 2003/0042707 A1* | 3/2003 | McCarty | 280/477 |
| 2003/0094801 A1* | 5/2003 | Fox | B60S 9/02 280/766.1 |
| 2005/0038445 A1* | 2/2005 | Errico | A61F 2/442 606/99 |
| 2005/0073130 A1* | 4/2005 | McGlothlin | 280/475 |
| 2007/0108027 A1* | 5/2007 | Yeung | H01H 13/7065 200/5 E |
| 2008/0217898 A1* | 9/2008 | Hanscom | 280/763.1 |
| 2008/0296869 A1* | 12/2008 | Hugo Duarte Santos | 280/475 |
| 2009/0020404 A1* | 1/2009 | Yeung | H01H 13/7065 200/5 E |
| 2009/0322060 A1* | 12/2009 | Macdougall | 280/491.3 |
| 2013/0249191 A1* | 9/2013 | Lambros | B60S 9/00 280/475 |

* cited by examiner

LANDING GEAR LOCKING MECHANISM

FIELD OF INVENTION

The present invention relates to a logging trailer and more specifically to a trailer on which logs are transported from a logging operation over the public highways to a sawmill or other processing facility. In even greater particularity, the present invention relates to improvements in the landing gear of such trailers on which the trailer rests when not connected to a tractor, such as in the field awaiting logs or when not in use. In still further particularity the present invention relates to a safety device for locking the landing gear of such trailers selectively in place in a stowed position or in a load bearing position.

BACKGROUND

Trailers used in the logging industry typically are connected to an associated tractor using a fifth-wheel connection such that the front of the trailer is supported on a tractor or other prime mover. When the trailer is to be detached, a set of landing gear or legs are lowered to engage the ground and support the trailer. Typically, when the legs are lowered or raised a safety pin is inserted such that the landing gear is securely held in either its stowed or lowered position. This requires the driver to go to both sides of the trailer to place or remove the pins, or he may duck under the trailer to gain access to the other side. In any event, the procedure is cumbersome and drivers do not like taking the time to set both sides. Occasionally, a driver will simply forget to pin both sides and the trailer, if left un-attended, experience a stability issue such that the landing gear fails on the unpinned side and damages the trailer.

SUMMARY OF THE INVENTION

A general object of the invention is to easily lock the landing gear of a trailer into either a stowed position or a support position from one side of the trailer. A second object of the invention is to improve the safety of the trailer when unattended, and a third object of the invention is to improve the safety of the operator while securing the landing gear in its selected position.

BRIEF DESCRIPTION OF THE DRAWINGS

Referring to the drawings which are appended hereto and which form a portion of this disclosure, it may be seen that.

DETAILED DESCRIPTION

Figure 1:
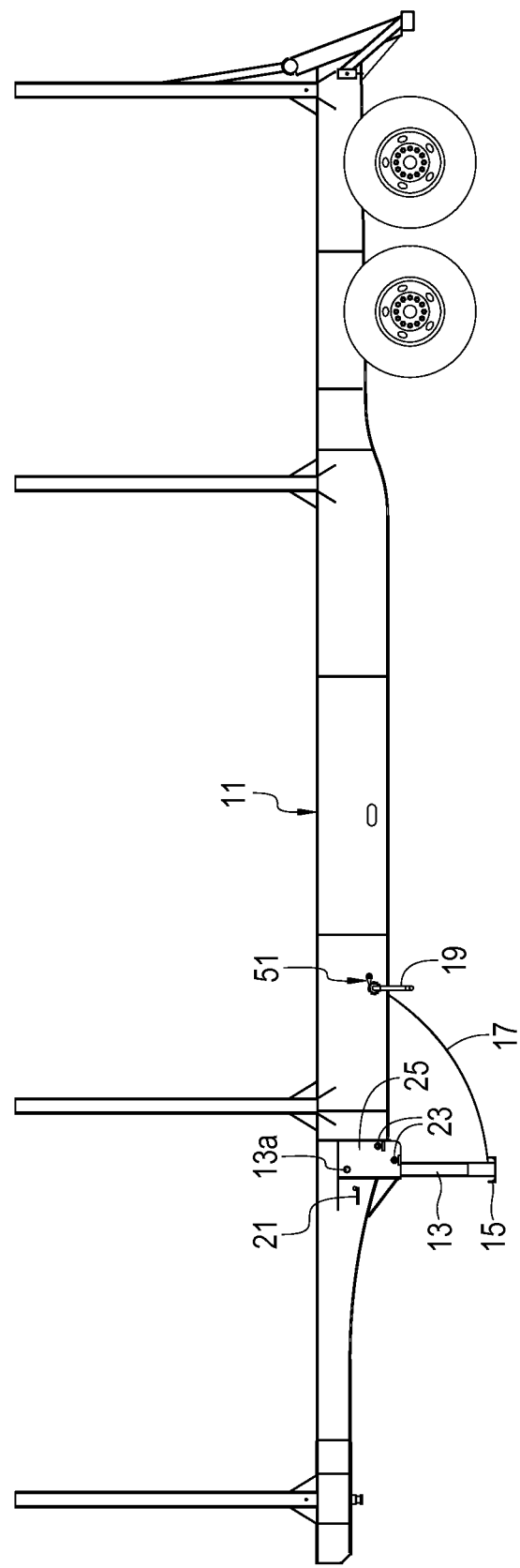
FIG. 1 is a side elevation view of a trailer on which our new landing gear is installed.
Figure 2:
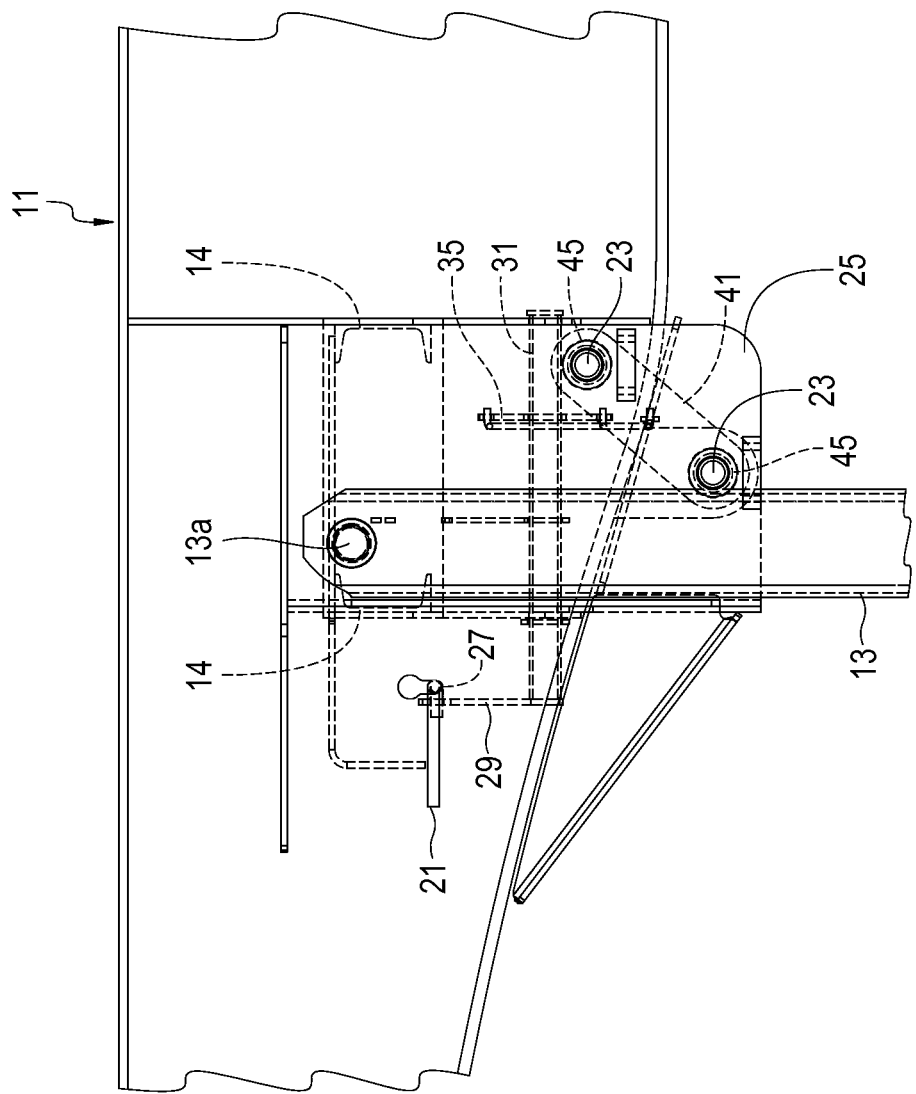
FIG. 2 is a detail elevation view of the locking mechanism.
Figure 5:
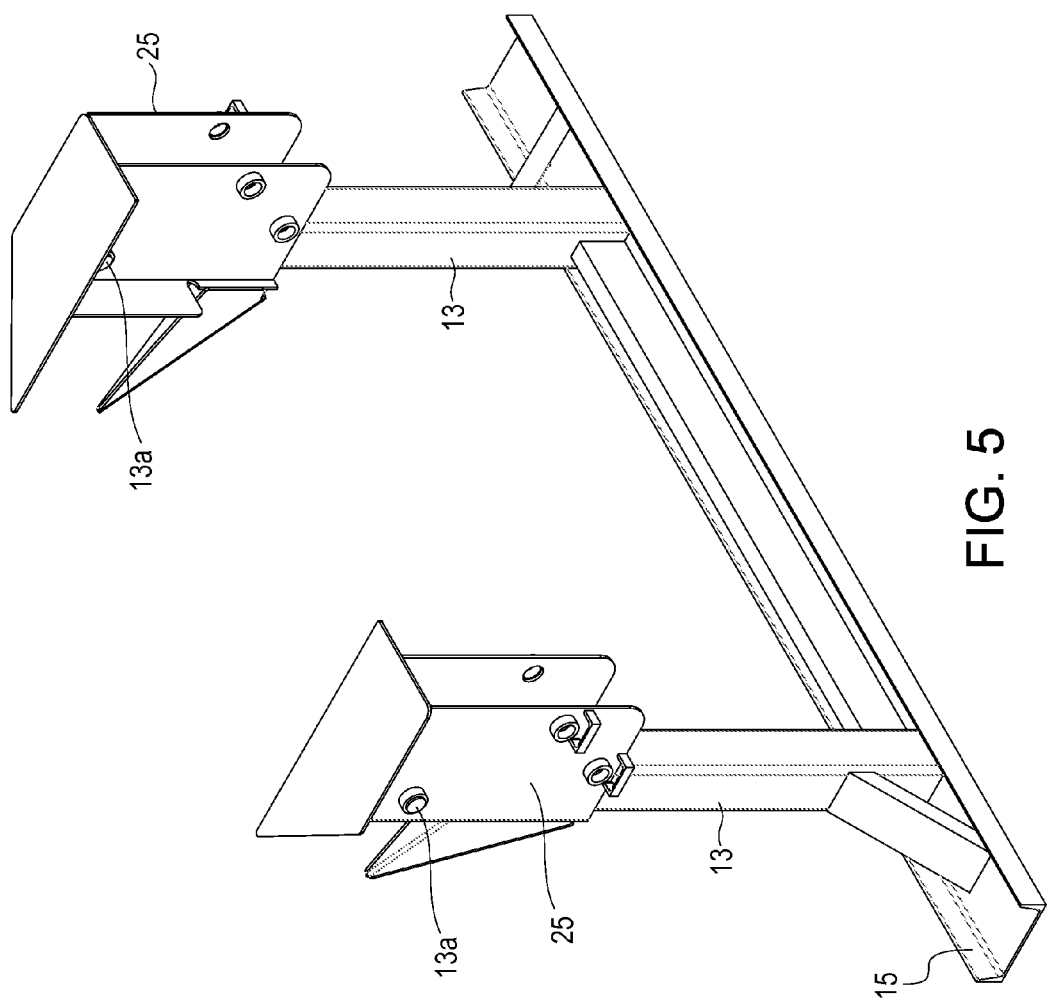
FIG. 5 is a perspective view of the landing gear mounting assembly.

One or more of the above objects can be achieved, at least in part, by providing a landing gear that pivots for storage and is easily secured. Referring to the drawings for a clearer understanding of the invention, it may be seen in FIG. 1 that a trailer frame 11 is supported on its front end by a pair of legs 13 connected by a brace member 15 extending transverse to the trailer frame 11. Referring to FIG. 5, legs 13 are pivotally mounted to trailer frame 11 by pin 13a which extends through the upper end of legs 13 and allows the legs to pivot rearwardly relative to trailer frame 11 in a landing gear housing 25. Legs 13, brace 15 and their associated gussets and braces are collectively referred to as the landing gear. As will be understood by those familiar with logging trucks, the landing gear is a substantial piece of equipment and must be able to support the front of the trailer in either a loaded or unloaded condition. Typically, the driver of the associated tractor will back under the front of the trailer to engage the fifth wheel on the truck with the king pin of the trailer.

Figure 6:
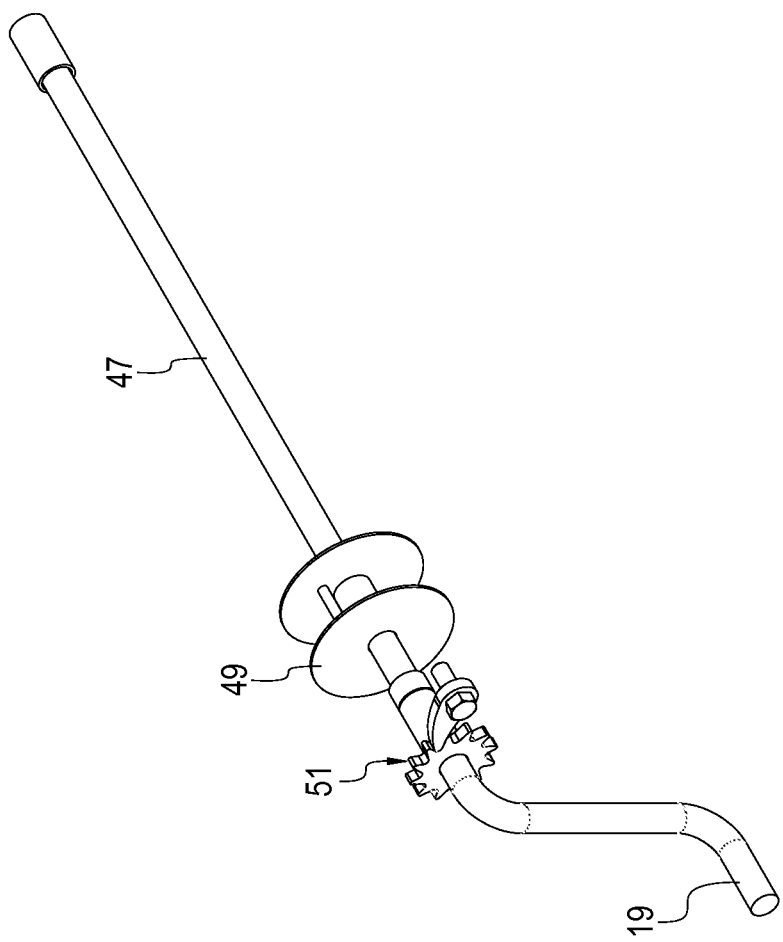
FIG. 6 is a perspective view of the winch assembly.

The landing gear is conventionally raised and lowered by an attached strap 17 which is engaged within winch sheave 49 mounted on a shaft 47 mounted for rotation within trailer frame 11 and connected to an external which handle 19. When the landing gear is in a non-loadbearing condition, an operator can raise or lower the landing gear by rotating the winch handle 19 and thus the winch sheave 49 within which the strap is wound. As shown in FIG. 6, a ratchet and pawl stop is provided in conjunction with the winch handle 19. Alternatively, an electric or hydraulic motor may be provided to rotate shaft 47 to raise or lower the landing gear. In any event the landing gear must be locked in place when bearing the load of the trailer and in a stowed position while the trailer is being transported.

To assure that the landing gear remains in position, the present invention utilizes a pair of opposed locking pin assemblies that are simultaneously retracted from a seated position to allow the landing gear to change position and then reseated to secure the landing gear. Each assembly includes a pair of parallel locking pins 23 mounted to a locking pin plate 41 in a substantially perpendicular orientation. The pins 23 are received in a pair of pin guides 45 mounted to the trailer frame 11 proximal the pivotal connection at 13a of the landing gear assembly to the trailer frame. The guides direct the pins 23 into locking position such that one pin prevents the landing gear assembly legs 13 from pivoting when in the support position and the other pin prevents the landing gear assembly legs 13 from pivoting down when in the raised and stowed position.

Figure 3:
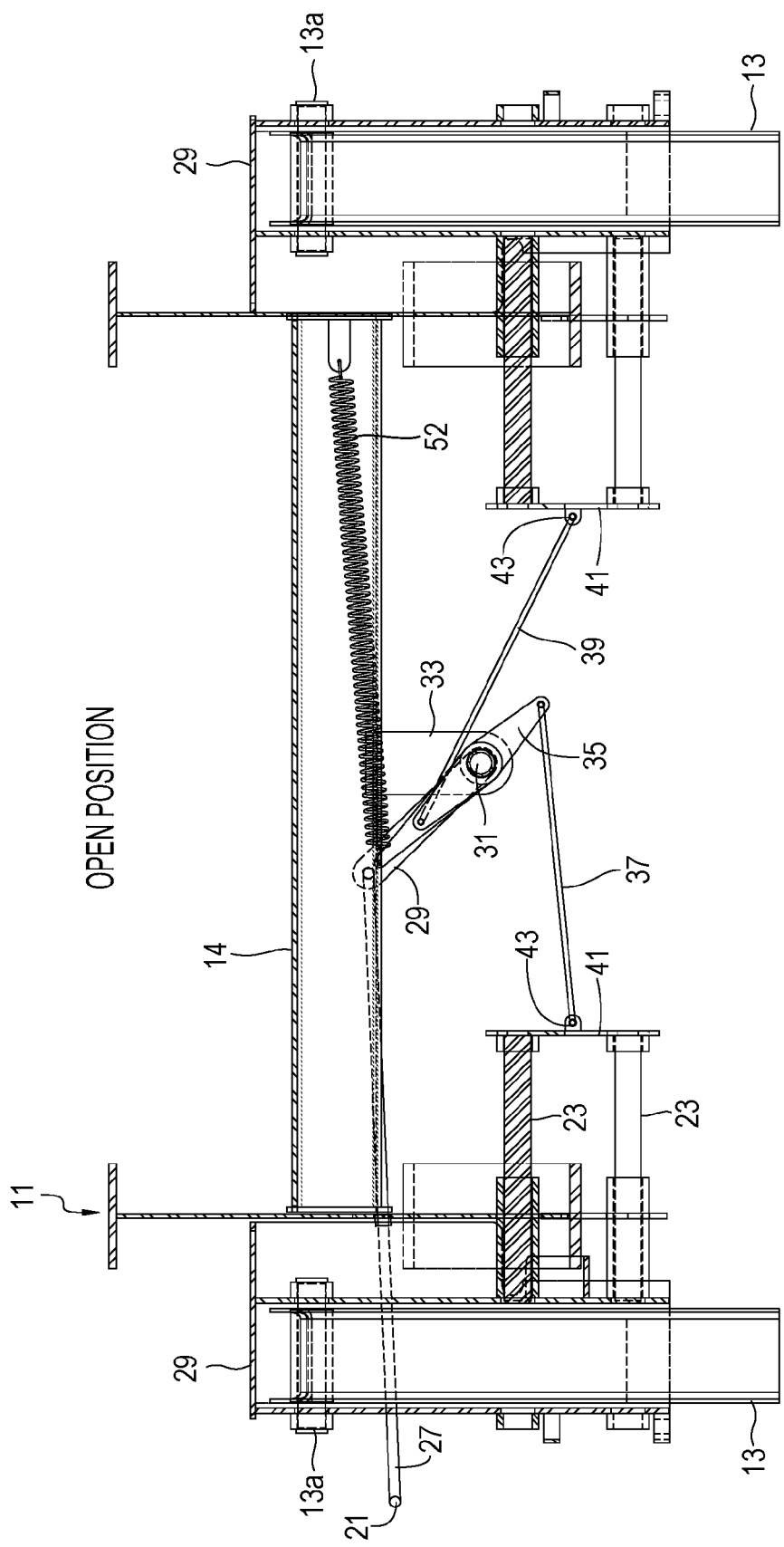
FIG. 3 is a sectional view transverse the trailer frame showing the locking mechanism in the open position.
Figure 4:
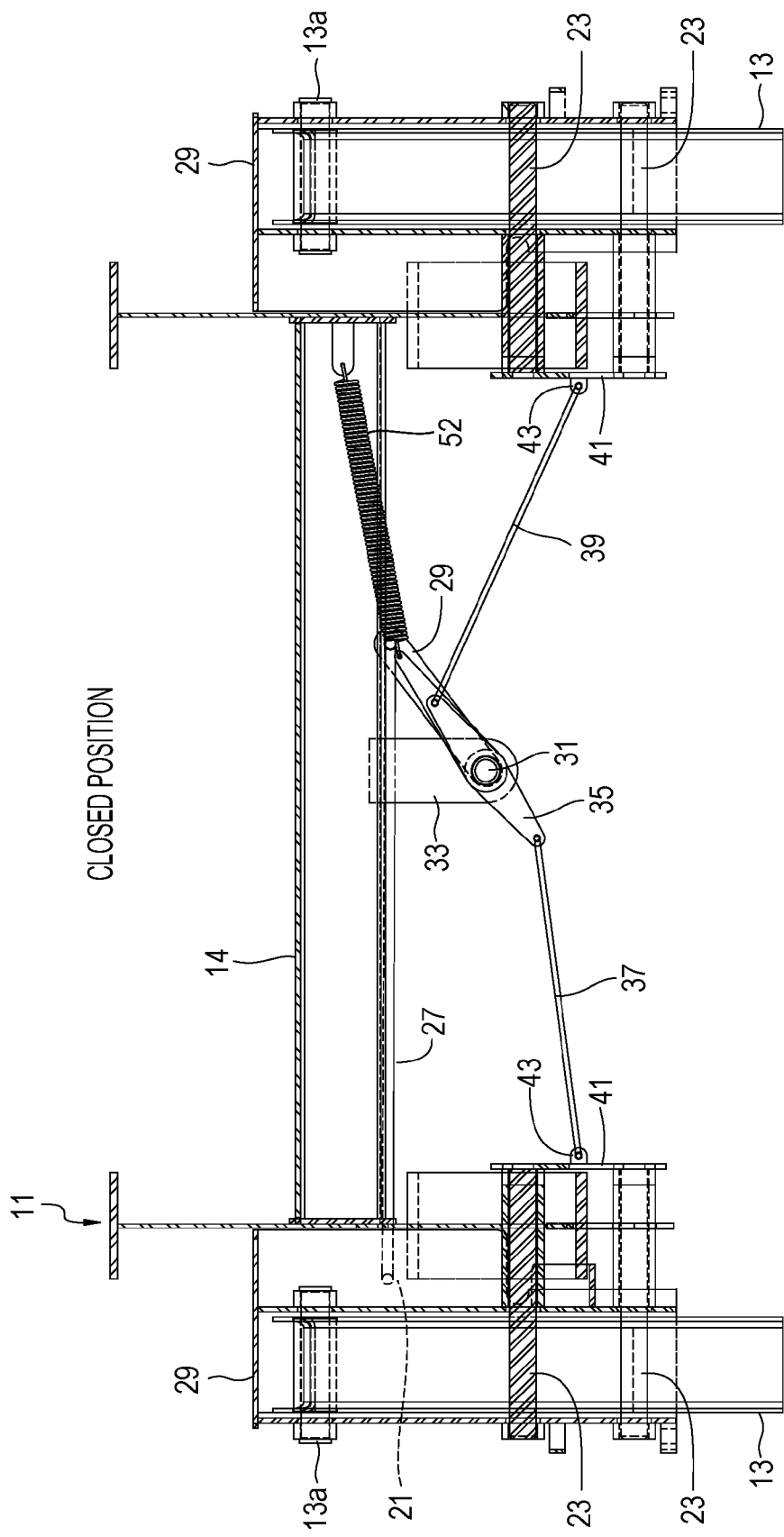
FIG. 4 is a sectional view transverse the trailer frame showing the locking mechanism in the closed position.

The locking pins 23 are selectively movable between a locked and free position, shown in FIGS. 3 & 4, by an operator standing adjacent one side of the trailer frame 11. The operator would use a handle 21 extending through the trailer frame 11 and connected to an actuator rod 27 running transversely of the trailer. Actuator rod 27 is pivotally connected to an actuator arm 29 which extends radially from a positioning shaft 31 rotably mounted with its axis extending longitudinally of the trailer frame 11. Thus, the operator is able to rotate the positioning shaft 31 through an arc by pushing or pulling the handle 21 away from or toward the trailer frame 11. Extending from the shaft 31 is a double ended bell crank 35 which is pivotally connected to a pair of positioning rods 37 and 39 that are connected to the pin plates 41 with a ball joint connection 43 such that rotation of the positioning shaft 31 in one direction moves the plate 41 and pins 23 to a locked position such that the landing gear assembly is retained in either the supporting or stowed position. Rotation of the shaft 31 in the opposite direction moves the pins 23 into an open position such that the landing gear assembly may be moved between the supporting position and stowed position.

Spring 52 is connected between the trailer frame 11 and the actuator arm 29 such that the mechanism is biased toward a closed or locked position. The spring 52 and arm 29 may be oriented such that an over center condition is achieved in which the spring will bias the mechanism toward either an open or locked position and will assist in moving the locking mechanism once the operator urges the handle beyond the over center position.

It may be seen that using the invention, the operator can readily move the locking pins from one side of the trailer without walking around or crawling under the trailer. Thus, to move the landing gear from the locked supporting position to a stowed position, he can easily feed slack into the strap 17 using winch handle 19. Pull on locking handle 21 to move the pins 23 to the open position, step into his cab to pull the trailer forward to allow the landing gear assembly to pivot to a non-supporting position. Step out of his cab to use handle 19 to winch the landing gear assembly to the stowed position and engage the ratchet stop to temporarily arrest the winch and use locking handle 21 to return the pins to their locking position which will retain the landing gear in the stowed position with the ratchet stop released.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

What I claim is:

1. In a trailer having a front end and a back end, with the back end supported by a plurality of tires and the front end adapted for connection to a prime mover, the improvement comprising:
   a. a landing gear assembly pivotally mounted to said trailer proximal said front end and selectively movable between a supporting position and a raised stored position;
   b. a winch and belt assembly operatively connected to said landing gear assembly and said trailer for selectively repositioning said landing gear assembly between said supporting position and said stored position;
   c. at least one locking pin assembly selectively movable between a locked position and an open position, said at least one locking pin assembly restricting movement of said landing gear from said supporting position or said stored position, said locking pin assembly including at least one locking pin plate carrying at least two locking pins mounted for concomitant movement between said locked position and said open position without relative movement between said at least one locking pin plate and said at least two locking pins.

2. The improvement as defined in claim 1 further comprising a spring for biasing said locking pin assembly towards said locked position.

3. In a trailer having a front end and a back end, with the back end supported by a plurality of tires and the front end adapted for connection to a prime mover, the improvement comprising:
   d. a landing gear assembly pivotally mounted to said trailer proximal said front end and selectively movable between a supporting position and a raised stored position;
   e. a winch and belt assembly operatively connected to said landing gear assembly and said trailer for selectively repositioning said landing gear assembly between said supporting position and said stored position;
   f. at least one locking pin assembly selectively movable between a locked position and an open position, said at least one locking pin assembly restricting movement of said landing gear from said supporting position or said stored position said locking pin assembly further comprising at least one locking pin plate carrying at least two locking pins mounted for concomitant movement therewith between said locked position and said open position without relative movement between said at least one locking pin plate and said at least two locking pins; and,
   g. a spring for biasing said locking pin assembly towards said locked position.

4. The improvement as defined in claim 3 wherein said at least two locking pins are axially movable within a pair of locking pin guides mounted to said trailer proximal said landing gear assembly.

5. The improvement as defined in claim 4 wherein said landing gear assembly includes at least one leg pivotally mounted to said trailer such that said at least one leg is secured in said supporting position by one of said two locking pins when in said locked position and secured in said stored position by the other of said two locking pins when in said locked position.

6. The improvement as defined in claim 4 further comprising a manually operable handle connected to said locking pin plate to urge said locking pins between said locked position and said open position.

7. The improvement as defined in claim 6 further comprising an actuating lever extending substantially radially from a shaft mounted for rotation on said trailer and connected to said handle, said shaft carrying a bell crank for concomitant rotation therewith, said bell crank connected to a positioning rod at a first end thereof, with said positioning rod operably connected to said locking pin plate.

8. The improvement as defined in claim 7 wherein said spring is connected between said trailer frame and actuating lever.

9. The improvement as defined in claim 8 wherein said landing gear assembly includes at least one leg pivotally mounted to said trailer such that said at least one leg is secured in said supporting position by one of said two locking pins when in said locked position and secured in said stored position by the other of said two locking pins when in said locked position.

10. The improvement as defined in claim 8 wherein said landing gear assembly includes at least two legs pivotally mounted to said trailer such that each of said legs is secured in said supporting position by an associated locking pin assembly when in said locked position and secured in said stored position by said associated locking pin assembly.

11. In a trailer supported having a front end and a back end, with the back end supported by a plurality of tires and the front end adapted for connection to a prime mover, the improvement comprising:
   a. a landing gear assembly pivotally mounted to said trailer proximal said front end and selectively movable between a supporting position and a raised stored position;
   b. a winch and belt assembly operatively connected to said landing gear assembly and said trailer for selectively repositioning said landing gear assembly between said supporting position and said stored position;

c. at least one locking pin assembly selectively movable between a locked position and an open position, said at least one locking pin assembly restricting movement of said landing gear from said supporting position or said stored position, said locking pin assembly including at least one locking pin plate carrying at least one locking pin mounted for concomitant movement therewith between said locked position and said open position without relative movement between said at least one locking pin plate and said at least one locking pin.

* * * * *